(12) United States Patent
Weissman et al.

(10) Patent No.: US 11,374,633 B2
(45) Date of Patent: Jun. 28, 2022

(54) LOW COST POWER EFFICIENT ANTENNA SWITCH DIVERSITY AND CYCLIC DELAY DIVERSITY TRANSCEIVER

(71) Applicant: QUALCOMM Incorporated, San Diego, CA (US)

(72) Inventors: Haim Weissman, Haifa (IL); Cheng Tan, Denver, CO (US); In Hyuck Yeo, San Diego, CA (US); Cheol Hee Park, San Diego, CA (US); Jungsik Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/953,173

(22) Filed: Nov. 19, 2020

(65) Prior Publication Data

US 2021/0159956 A1    May 27, 2021

Related U.S. Application Data

(60) Provisional application No. 62/938,730, filed on Nov. 21, 2019.

(51) Int. Cl.
*H04L 27/00* (2006.01)
*H04B 7/02* (2018.01)
*H04B 7/06* (2006.01)

(52) U.S. Cl.
CPC .................. *H04B 7/0604* (2013.01)

(58) Field of Classification Search
CPC .................................................... H04B 7/0604
USPC ................................................ 375/267, 299
See application file for complete search history.

(56) References Cited

U.S. PATENT DOCUMENTS

| | | | |
|---|---|---|---|
| 2010/0056074 A1* | 3/2010 | Higuchi | H04B 7/0604 455/77 |
| 2010/0069028 A1* | 3/2010 | Choi | H04B 7/0602 455/136 |
| 2012/0008510 A1* | 1/2012 | Cai | H04B 7/0404 370/252 |
| 2012/0106671 A1* | 5/2012 | Chapman | H04W 28/22 375/295 |
| 2013/0095869 A1* | 4/2013 | Christoffersson | H04B 1/40 455/501 |
| 2013/0265890 A1* | 10/2013 | Ali | H04B 7/0404 370/252 |
| 2013/0266085 A1* | 10/2013 | Sesia | H04B 7/0689 375/295 |
| 2018/0167252 A1* | 6/2018 | Wang | H04L 27/2613 |
| 2019/0372630 A1* | 12/2019 | Brunel | H04B 7/0695 |

* cited by examiner

*Primary Examiner* — Don N Vo
(74) *Attorney, Agent, or Firm* — Holland & Hart LLP

(57) ABSTRACT

Methods, systems, and devices for wireless communications are described. A user equipment (UE) may determine to operate in an antenna switch diversity mode to transmit an uplink signal according to an antenna switching pattern, the antenna switching pattern comprising switching between a first transmit chain coupled to a first antenna and a second transmit chain coupled to a second antenna. The UE may transmit at least a first portion of the uplink signal using the first transmit chain coupled to the first antenna, the first transmit chain coupled to the first antenna. The UE may transmit at least a second portion of the uplink signal using the second transmit chain coupled to the second antenna, the second transmit chain coupled to the second antenna.

30 Claims, 11 Drawing Sheets

LOW COST POWER EFFICIENT ANTENNA SWITCH DIVERSITY AND CYCLIC DELAY DIVERSITY TRANSCEIVER

CROSS REFERENCE

The present application for patent claims the benefit of U.S. Provisional Patent Application No. 62/938,730 by WEISSMAN et al., entitled "LOW COST POWER EFFICIENT ANTENNA SWITCH DIVERSITY AND CYCLIC DELAY DIVERSITY TRANSCEIVER." filed Nov. 21, 2019, assigned to the assignee hereof, and expressly incorporated by reference herein.

BACKGROUND

The following relates generally to wireless communications, and more specifically to low cost power efficient antenna switch diversity and cyclic delay diversity transceiver.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support low cost power efficient antenna switch diversity and cyclic delay diversity (CDD) transceiver. Generally, the described techniques provide for a user equipment (UE) with multiple transmit chains being configured to support both CDD and antenna switch diversity at the modem level. That is, antenna switching (e.g., switching a transmit chain between different antennas) is typically done using an antenna switch in the radio frequency (RF) front-end of the UE. However, the described techniques may support removal of the antenna switch from the RF front-end of the UE. The described techniques may, instead, implement antenna switch diversity at the modem, the wireless transmitter/receiver (WRT), and/or one or more power amplifiers (PAs), and the like, of the UE. For example, the UE may determine to operate in the antenna switch diversity mode during an uplink transmission. The antenna switch diversity mode may include the UE switching between a first transmit chain coupled to a first antenna and a second transmit chain coupled to a second antenna. The UE may perform the uplink transmission by transmitting a first portion of the uplink signal using the first transmit chain coupled to the first antenna and transmitting a second portion of the uplink signal using the second transmit chain coupled to the second antenna. In some aspects, this may include disabling or deactivating the second transmit chain when the first portion of the uplink signal is being transmitted by the first transmit chain coupled to the first antenna. This may also include disabling or deactivating the first transmit chain when the second portion of the uplink signal is being transmitted by the second transmit chain coupled to the second antenna. This antenna switching pattern may continue during transmission of the uplink signal.

A method of wireless communication at a UE is described. The method may include determining to operate in an antenna switch diversity mode to transmit an uplink signal according to an antenna switching pattern, the antenna switching pattern including switching between a first transmit chain coupled to a first antenna and a second transmit chain coupled to a second antenna, transmitting at least a first portion of the uplink signal using the first transmit chain coupled to the first antenna, the first transmit chain coupled to the first antenna enabled according to the antenna switching pattern during transmission of the first portion of the uplink signal, and transmitting at least a second portion of the uplink signal using the second transmit chain coupled to the second antenna, the second transmit chain coupled to the second antenna enabled according to the antenna switching pattern during transmission of the second portion of the uplink signal.

An apparatus for wireless communication at a UE is described. The apparatus may include a processor, memory coupled with the processor, and instructions stored in the memory. The instructions may be executable by the processor to cause the apparatus to determine to operate in an antenna switch diversity mode to transmit an uplink signal according to an antenna switching pattern, the antenna switching pattern including switching between a first transmit chain coupled to a first antenna and a second transmit chain coupled to a second antenna, transmit at least a first portion of the uplink signal using the first transmit chain coupled to the first antenna, the first transmit chain coupled to the first antenna enabled according to the antenna switching pattern during transmission of the first portion of the uplink signal, and transmit at least a second portion of the uplink signal using the second transmit chain coupled to the second antenna, the second transmit chain coupled to the second antenna enabled according to the antenna switching pattern during transmission of the second portion of the uplink signal.

Another apparatus for wireless communication at a UE is described. The apparatus may include means for determining to operate in an antenna switch diversity mode to transmit an uplink signal according to an antenna switching pattern, the antenna switching pattern including switching between a first transmit chain coupled to a first antenna and a second transmit chain coupled to a second antenna, transmitting at least a first portion of the uplink signal using the first transmit chain coupled to the first antenna, the first transmit chain coupled to the first antenna enabled according to the antenna switching pattern during transmission of the first portion of the uplink signal, and transmitting at least a second portion of the uplink signal using the second transmit chain coupled to the second antenna, the second transmit chain coupled to the second antenna enabled according to the antenna switching pattern during transmission of the second portion of the uplink signal.

A non-transitory computer-readable medium storing code for wireless communication at a UE is described. The code may include instructions executable by a processor to determine to operate in an antenna switch diversity mode to transmit an uplink signal according to an antenna switching pattern, the antenna switching pattern including switching between a first transmit chain coupled to a first antenna and a second transmit chain coupled to a second antenna, transmit at least a first portion of the uplink signal using the first transmit chain coupled to the first antenna, the first transmit chain coupled to the first antenna enabled according to the antenna switching pattern during transmission of the first portion of the uplink signal, and transmit at least a second portion of the uplink signal using the second transmit chain coupled to the second antenna, the second transmit chain coupled to the second antenna enabled according to the antenna switching pattern during transmission of the second portion of the uplink signal.

Some examples of the method, apparatuses, and non-transitory computer-readable medium described herein may further include operations, features, means, or instructions for determining that CDD may be to be used during transmission of a second uplink signal, and transmitting, based on the CDD, a first portion of the second uplink signal using the first transmit chain coupled to the first antenna concurrently with transmission of a second portion of the second uplink signal using the second transmit chain coupled to the second antenna.

Some examples of the method, apparatuses, and non-transitory computer-readable medium described herein may further include operations, features, means, or instructions for deactivating, according to the antenna switching pattern, the second transmit chain coupled to the second antenna during transmission of the first portion of the uplink signal using the first transmit chain coupled to the first antenna, and deactivating, according to the antenna switching pattern, the first transmit chain coupled to the first antenna during transmission of the second portion of the uplink signal using the second transmit chain coupled to the second antenna, where transmission of the first portion and the second portion of the uplink signal occur consecutively.

In some examples of the method, apparatuses, and non-transitory computer-readable medium described herein, deactivating the first transmit chain and deactivating the second transmit chain may include operations, features, means, or instructions for setting an amplification factor for a first power amplifier and the transmit chain prior to the first power amplifier in the first transmit chain to below a threshold, and setting an amplification factor for a second power amplifier and the transmit chain prior to the second power amplifier in the second transmit chain to below the threshold.

In some examples of the method, apparatuses, and non-transitory computer-readable medium described herein, deactivating the first transmit chain and deactivating the second transmit chain may include operations, features, means, or instructions for deactivating a first power amplifier and the transmit chain prior to the first power amplifier in the first transmit chain, and deactivating a second power amplifier and the transmit chain prior to the second power amplifier in the second transmit chain.

In some examples of the method, apparatuses, and non-transitory computer-readable medium described herein, deactivating the first transmit chain and deactivating the second transmit chain may include operations, features, means, or instructions for disabling a first data path feed into the first transmit chain, and disabling a second data path feed into the second transmit chain.

In some examples of the method, apparatuses, and non-transitory computer-readable medium described herein, deactivating the first transmit chain and deactivating the second transmit chain may include operations, features, means, or instructions for deactivating a first portion of a modem in the first transmit chain, and deactivating a second portion of the modem in the second transmit chain.

In some examples of the method, apparatuses, and non-transitory computer-readable medium described herein, deactivating the first transmit chain and deactivating the second transmit chain may include operations, features, means, or instructions for deactivating a first radio frequency transceiver in the first transmit chain, and deactivating a second radio frequency transceiver in the second transmit chain.

In some examples of the method, apparatuses, and non-transitory computer-readable medium described herein, deactivating the first transmit chain and deactivating the second transmit chain may include operations, features, means, or instructions for ramping up the deactivated first transmit chain coupled to the first antenna a threshold time prior to enabling the first transmit chain for transmitting at least the first portion of the uplink signal, and ramping up the deactivated second transmit chain coupled to the second antenna the threshold time prior to enabling the second transmit chain for transmitting at least the second portion of the uplink signal.

Some examples of the method, apparatuses, and non-transitory computer-readable medium described herein may further include operations, features, means, or instructions for determining to operate in the antenna switch diversity mode in a modem of the UE.

In some examples of the method, apparatuses, and non-transitory computer-readable medium described herein, the antenna switching pattern may include operations, features, means, or instructions for activating the first transmit chain coupled to the first antenna for a first time period for transmission of at least the first portion of the uplink signal, and activating the second transmit chain coupled to the second antenna for a second time period for transmission of at least the second portion of the uplink signal.

In some examples of the method, apparatuses, and non-transitory computer-readable medium described herein, the first time period and the second time period include at least one of a transmission opportunity, or a mini-slot, or a slot, or a subframe, or a frame, or a combination thereof.

Some examples of the method, apparatuses, and non-transitory computer-readable medium described herein may further include operations, features, means, or instructions for transmitting at least a third portion of the uplink signal using a third transmit chain coupled to a third antenna, the third transmit chain coupled to the third antenna enabled according to the antenna switching pattern during transmission of the third portion of the uplink signal.

DETAILED DESCRIPTION

Figure 1:
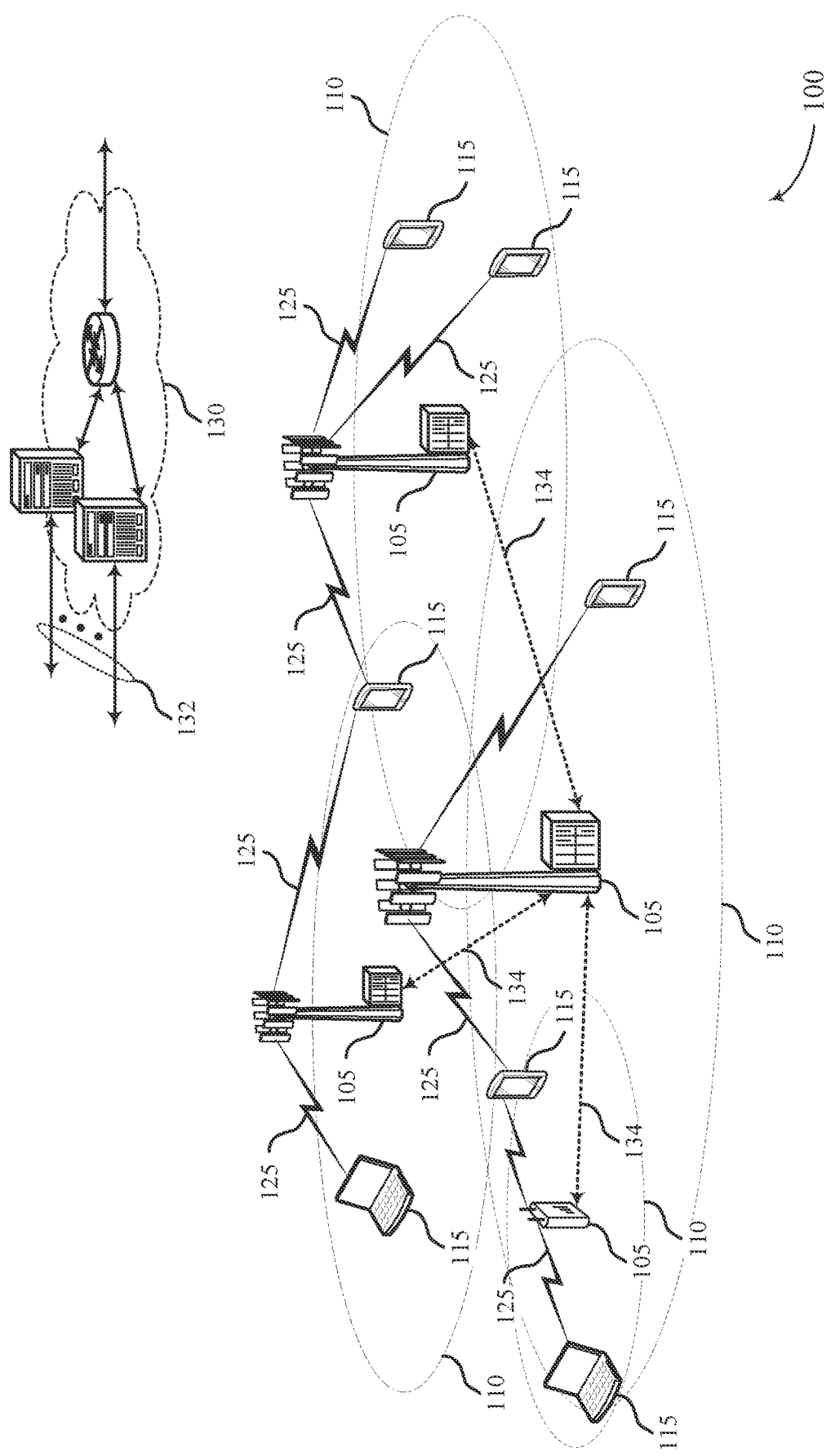
FIG. 1 illustrates an example of a system for wireless communications that supports low cost power efficient antenna switch diversity and cyclic delay diversity transceiver in accordance with aspects of the present disclosure.

User equipment (UE) may be configured with multiple transmit chains and antennas. The UE may use the transmit chains to operate in a cyclic delay diversity (CDD) mode where the UE transmits from both (or all, for example, for three or more transmit chains) transmit chains simultaneously with cyclic delay (e.g., different phase delay) in one signal with respect to the other signal. The transmit chain's gains are set/adjusted simultaneously with a minimal delay (e.g., an order of less than 200 nano seconds, as one non-limiting example) between them. The UE may also use the transmit chains to operate in an antenna switch diversity mode where the UE transmits using one transmit chain where the transmit chain is switched between different antennas during an uplink transmission. This is typically achieved using an antenna switch (e.g., a hardware radio frequency switch) located at the radio frequency (RF) front-end of the UE. However, the antenna switch at the RF front-end adds to the cost of the UE and introduces a front-end insertion loss into the uplink transmission. Accordingly, aspects of the described techniques remove the antenna switch from the RF front-end of the UE. The described techniques also continue to support antenna switch diversity by the UE.

Aspects of the disclosure are initially described in the context of a wireless communications system. Generally, the described techniques provide for a UE with multiple transmit chains being configured to support both CDD and antenna switch diversity, for example at the modem level. That is, antenna switching (e.g., switching a transmit chain between different antennas) is typically done using an antenna switch in the RF front-end of the UE. However, the described techniques may support removal of the antenna switch from the RF front-end of the UE and, instead, implement antenna switch diversity at the modem, the wireless transmitter/receiver (WMR), one or more power amplifiers (PAs), and the like, of the UE. For example, the UE may determine to operate in the antenna switch diversity mode during an uplink transmission. The antenna switch diversity mode may include the UE switching between a first transmit chain coupled to a first antenna and a second transmit chain coupled to a second antenna. The UE may perform the uplink transmission by transmitting a first portion of the uplink signal using the first transmit chain coupled to the first antenna and transmitting a second portion of the uplink signal using the second transmit chain coupled to the second antenna. In some aspects, this may include disabling or deactivating the second transmit chain when the first portion of the uplink signal is being transmitted by the first transmit chain coupled to the first antenna. This may also include disabling or deactivating the first transmit chain when the second portion of the uplink signal is being transmitted by the second transmit chain coupled to the second antenna.

This antenna switching (of antenna switch diversity) may be done on a per subframe (SF) basis. At the beginning of each SF, the antenna is switched (new antenna is selected for transmission).

The selection of the transmit diversity mode to either antenna switch diversity or CDD may be done by the modem. The transition from antenna switch diversity to CDD, and vice versa, may be done at the beginning of each SF.

Aspects of the disclosure are further illustrated by and described with reference to apparatus diagrams, system diagrams, and flowcharts that relate to low cost power efficient antenna switch diversity and cyclic delay diversity transceiver.

FIG. 1 illustrates an example of a wireless communications system 100 that supports low cost power efficient antenna switch diversity and cyclic delay diversity transceiver in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (cNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTIs). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TT duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may determine to operate in an antenna switch diversity mode to transmit an uplink signal according to an antenna switching pattern, the antenna switching pattern comprising switching between a first transmit chain coupled to a first antenna and a second transmit chain coupled to a second antenna. The UE 115 may transmit at least a first portion of the uplink signal using the first transmit chain coupled to the first antenna, the first transmit chain coupled to the first antenna enabled according to the antenna switching pattern during transmission of the first portion of the uplink signal. The UE 115 may transmit at least a second portion of the uplink signal using the second transmit chain coupled to the second antenna, the second transmit chain coupled to the second antenna enabled according to the antenna switching pattern during transmission of the second portion of the uplink signal.

Figure 2:
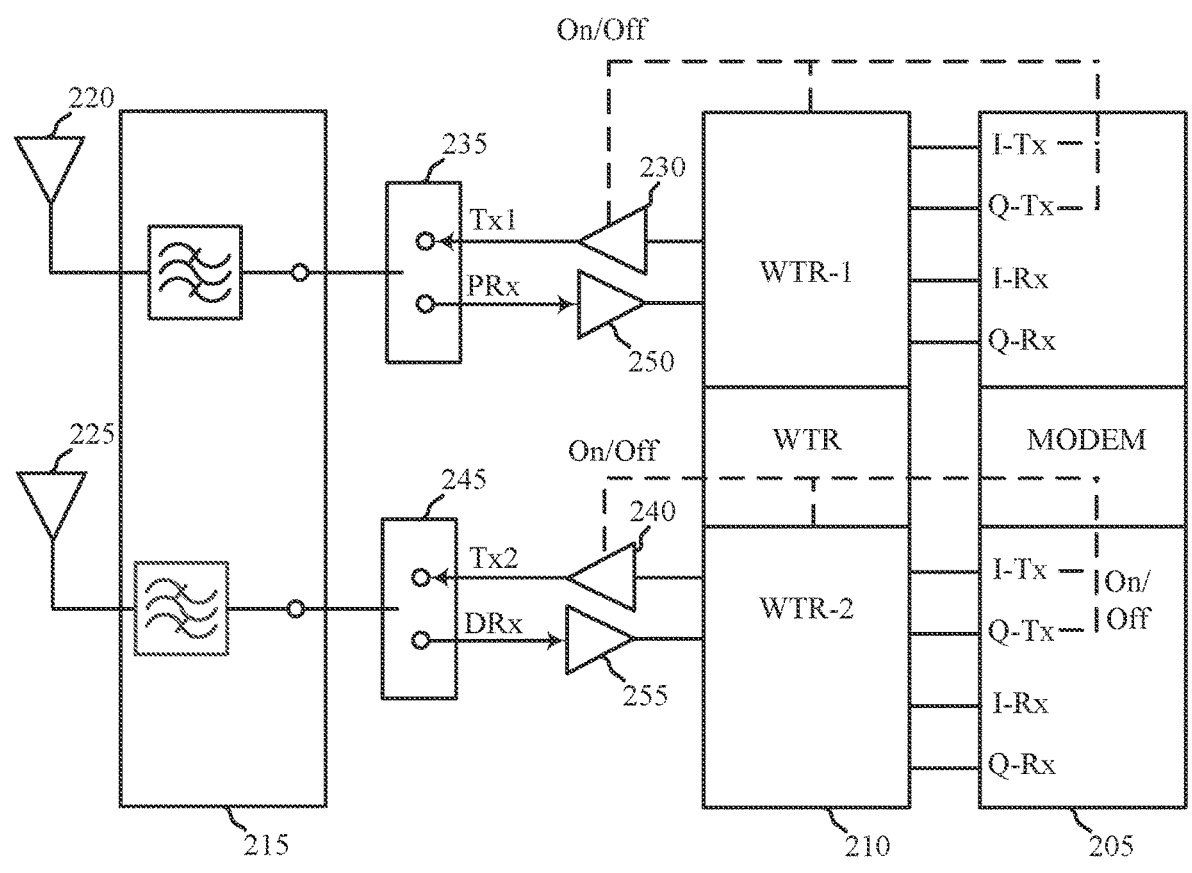
FIG. 2 illustrates an example of a block diagram of a user equipment that supports low cost power efficient antenna switch diversity and cyclic delay diversity transceiver in accordance with aspects of the present disclosure.

FIG. 2 illustrates an example of a block diagram of a UE 200 that supports low cost power efficient antenna switch diversity and CDD transceiver in accordance with aspects of the present disclosure. In some examples, the UE 200 may implement aspects of wireless communication system 100. In some aspects, the UE 200 may be an example of a UE 115 as described herein.

UE 200 may include a modem 205, a transceiver 210 (e.g., a WTR), a RF front-end 215, a first antenna 220, and a second antenna 225. Collectively, the modem 205, transceiver 210, RF front-end 215, first antenna 220, and second antenna 225 may form a first transceiver chain and a second transceiver chain. That is, the components of UE 200 may be configured as a first transmit chain coupled to the first antenna 220 and a second transmit chain coupled to the second antenna 225 during the transmission of uplink signals. Similarly, the components of UE 200 may be configured as a first receive chain coupled to the first antenna 220 and a second receive chain coupled to the second antenna 225 during the reception of downlink signals.

More particularly, the first transmit chain may include a first portion of the modem 205 receiving a data stream or bitstream representative of information for transmission. The first portion of the modem 205 may include various components such as, but not limited to, a serial-to-parallel (S/P) converter, a mapper, an interleaver, an encoder, a modulator, and the like, which are configured to process the bitstream for transmission. The output of the first portion of the modem 205 may include in-phase transmit (I Tx) and quadrature (Q Tx) streams that are fed into a first portion of the transceiver 210. In some aspects, the functions performed by the first portion of the modem 205 may be considered baseband processing.

The first portion of the transceiver 210 includes various components such as, but not limited to, oscillator(s), mixer(s), filter(s), and the like, that are configured to process the I/Q bitstreams (information), convert the information from a baseband frequency to an intermediate frequency (IF), in some examples, and subsequently into a RF for transmission. The output of the first portion of the transceiver 210 is fed into a power amplifier 230 which amplifies the RF signal and then feeds the amplified signal into switch 235 (which is in electronic communication with the power amplifier 230). In some examples, the switch 235 may be integrated into the RF front-end 215 coupled to the first antenna 220 for transmission.

Similarly, the second transmit chain may include a second portion of the modem 205 receiving a data stream or bitstream representative of information for transmission. The second portion of the modem 205 may include various components such as, but not limited to, a S/P converter, a mapper, an interleaver, an encoder, a modulator, and the like, which are configured to process the bitstream for transmission. The output of the second portion of the modem 205 may include I Tx and Q Tx streams that are fed into a second portion of the transceiver 210. In some aspects, the functions performed by the second portion of the modem 205 may be considered baseband processing.

The second portion of the transceiver 210 includes various components such as, but not limited to, oscillator(s), mixer(s), filter(s), and the like, that are configured to process the I/Q bitstreams (information), convert the information from a baseband frequency to an IF, in some examples, and subsequently into a RF for transmission. The output of the second portion of the transceiver 210 is fed into a power amplifier 240 which amplifies the RF signal and then feeds the amplified signal into switch 245 (which is in electronic communication with the power amplifier 240). In some examples, the switch 245 may be integrated into the RF front-end 215 coupled to the second antenna 225 for transmission.

Receive operations may generally include the reverse operations with respect to the first transmit chain and second transmit chains. For example, a signal received at the first antenna 220 may be fed, via the first portion of the RF front-end 215, into switch 235 (which is switched from the transmit position to the primary receive (PRx) position) and fed into low noise amplifier 250 for amplification. The amplified signal is then fed into the first portion of the transceiver 210 for down-conversion (among other functions) into a baseband signal. The baseband signal is fed, in I/Q streams, into the first portion of the modem 205 for data recovery.

Similarly, a signal received at the second antenna 225 may be fed, via the second portion of the RF front-end 215, into switch 245 (which is switched from the transmit position to the discontinuous receive (DRx) position) and fed into low noise amplifier 255 for amplification. The amplified signal is then fed into the second portion of the transceiver 210 for down-conversion (among other functions) into a baseband signal. The baseband signal is fed, in I/Q streams, into the second portion of the modem 205 for data recovery.

In previous configurations, the RF front-end 215 may include an antenna diversity switch (not shown) that is a hardware component configured to switch the output of the first transmit chain and/or the second transmit chain between the first antenna 220 and the second antenna 225. This configuration supports the UE 200 operating in both an antenna switch diversity mode and a CDD mode. Under this previous configuration, the antenna switch diversity mode would include the UE 200 activating the first transmit chain (while deactivating the second transmit chain) for transmission of a first portion of the uplink signal via the first antenna 220, and then switching the first transmit chain from the first antenna 220 to the second antenna 225 for transmission of a second portion of the uplink signal via the second antenna 225. This antenna switching pattern would be repeated (e.g., the first transmit chain is switched between the first antenna 220 and the second antenna 225) for the uplink transmission. The CDD mode would include the UE 200 activating first transmit chain coupled to the first antenna 220 and the second transmit chain coupled to the second antenna 225 concurrently. The first and second transmit chains both transmit signals simultaneously with cyclic delay (different phase delay) in one signal with respect to the other signal. Switching between CDD mode and the antenna switch diversity mode may be on a per-subframe basis and based on various performance metrics (e.g., modulation and coding scheme (MCS), resource block (RB) allocation, Doppler properties, and the like).

However, these previous configurations suffered from numerous issues. One example issue includes the thermal heat generated by with RF front-end switch. For example, the constant switching of the first transmit chain between the first antenna 220 and the second antenna 225 may introduce excessive heat into UE 200. Another example issue includes the insertion loss introduced by the RF front-end switch. In some examples, the RF front-end switch introduces approximately 1 dB of insertion loss into the signal being transmitted. This resulted in the UE 200 increasing the transmission power to overcome the insertion loss, thus generating even more heat. Other issues associated with these previous configurations using the RF front-end switch include cost increases, increased hardware footprint, and the like.

Accordingly, aspects of the described techniques remove the RF front-end switch from the RF front-end 215 and, instead, couple the first transmit chain (and first receive chain during receive operations) to the first antenna 220 and couple the second transmit chain (and the second receive chain during receive operations) to the second antenna 225. The UE 200 may implement the antenna switch diversity mode at the modem 205, transceiver 210, and/or power amplifier 230/240 level. That is, UE 200 may be configured to operate in an antenna switch diversity mode for an uplink transmission according to an antenna switching pattern. The antenna switching pattern may include UE 200 switching, during the uplink transmission, between the first transmit chain coupled to the first antenna 220 and the second transmit chain coupled to the second antenna 225.

That is, UE 200 implementing the antenna switch diversity mode may include transmitting a first portion of the uplink signal using the first transmit chain coupled to the first antenna 220 and, then, transmitting a second portion of the uplink signal using the second transmit chain coupled to the second antenna 225. In some aspects, the second transmit chain may be deactivated, disabled, etc., while the first transmit chain coupled to the first antenna 220 is enabled to transmit the first portion of the uplink signal. Similarly, the first transmit chain may be deactivated, disabled, etc., while the second transmit chain coupled to the second antenna 225 is enabled to transmit the second portion of the uplink signal.

In some aspects, deactivating, disabling, or otherwise turning off the first transmit chain (while the second transmit chain is transmitting the second portion of the uplink signal) and/or the second transmit chain (while the first transmit chain is transmitting the first portion of the uplink signal) may achieved via various mechanisms, either alone or in any combination. One mechanism may include deactivating, turning off, removing power from, etc., the power amplifier 230 in the first transmit chain while the second transmit chain coupled to the second antenna 225 transmits the second portion of the uplink signal. Similarly, another mechanism may include deactivating, turning off, removing power from, etc., the power amplifier 240 in the second transmit chain while the first transmit chain coupled to the first antenna 220 transmits the first portion of the uplink signal. Other examples of mechanisms may include reducing the amplification factor for the respective power amplifier, removing (e.g., turning off) the signal being fed into the respective power amplifier.

Another mechanism may be implemented within transceiver 210. For example, this may include deactivating, turning off, removing power from, etc., an amplifier, a mixer, a filter, etc., in the first portion of the transceiver 210 of the first transmit chain while the second transmit chain coupled to the second antenna 225 transmits the second portion of the uplink signal. Another example may include deactivating, turning off, removing power from, etc., an amplifier, a mixer, a filter, etc., in the second portion of the transceiver 210 of the second transmit chain while the first transmit chain coupled to the first antenna 220 transmits the first portion of the uplink signal.

Another mechanism may be implemented within transceiver 210. For example, this may include deactivating, turning off, removing power from the first portion of the transceiver 210 of the first transmit chain while the second transmit chain coupled to the second antenna 225 transmits the second portion of the uplink signal. Another example may include deactivating, turning off, removing power from the second portion of the transceiver 210 of the second transmit chain while the first transmit chain coupled to the first antenna 220 transmits the first portion of the uplink signal.

Another mechanism may be implemented within (or before) modem 205. For example, this may include deactivating, turning off, removing power from, etc., a S/P converter, an encoder, a modulator, a mapper, etc., in the first portion of the modem 205 of the first transmit chain while the second transmit chain coupled to the second antenna 225 transmits the second portion of the uplink signal. Another example may include deactivating, turning off, removing power from, etc., a S/P converter, an encoder, a modulator, a mapper, etc., in the second portion of the modem 205 of the second transmit chain while the first transmit chain coupled to the first antenna 220 transmits the first portion of the uplink signal.

Another mechanism may be implemented within (or before) modem 205. For example, this may include deactivating, turning off, removing the bitstream (e.g., data path) being fed into the first portion of the modem 205 of the first transmit chain while the second transmit chain coupled to the second antenna 225 transmits the second portion of the uplink signal. Another example may include deactivating, turning off, removing the bitstream being fed into the second portion of the modem 205 of the second transmit chain while the first transmit chain coupled to the first antenna 220 transmits the first portion of the uplink signal.

Another mechanism may be implemented within modem 205. For example, this may include deactivating, turning off, removing power from the first portion of the modem 205 of the first transmit chain while the second transmit chain coupled to the second antenna 225 transmits the second portion of the uplink signal. Another example may include deactivating, turning off, removing power from the second portion of the modem 205 of the second transmit chain while the first transmit chain coupled to the first antenna 220 transmits the first portion of the uplink signal.

In some aspects, the example mechanisms discussed above may be implemented within modem 205. For example, modem 205 may include various components, functions, protocols, implemented in software and/or hardware, that are configured to implement the mechanism(s). The example mechanisms may be implemented based, at least in some aspects, on the determination by UE 200 to operate in the antenna switch diversity mode and according to the antenna switch pattern.

In some aspects, the example mechanisms discussed above may include an early wake-up option. For example, a transmit chain that is deactivated while the other transmit chain is transmitting the uplink signal according to the antenna switching pattern may be activated, turned on, enabled, etc., for a time (e.g., a minimal time) before it is expected to be activated in order to allow the transmit chain to ramp up for proper operation by the communications manager, modem, management unit, controller, etc. The transmit chain may be activated for the time with minimal gain (e.g., a gain less than a threshold that is less than full gain used during active transmissions) until it is active in order to avoid leakage above a pre-determined threshold as long as the transmit chain is not in active mode.

In some aspects, the antenna switching pattern of the antenna switch mode may be implemented according to the timing schedule. For example, the first transmit chain coupled to the first antenna 220 may be activated, enabled, etc., during a first time period for transmission of the first portion of the uplink signal. Similarly, the second transmit chain coupled to the second antenna 225 may be activated, enabled, etc., during a second time period for transmission of the second portion of the uplink signal. The first transmit chain coupled to the first antenna 220 may be deactivated, disabled, etc., during the second time period and the second transmit chain coupled to the second antenna 225 may be deactivated, disabled, etc., during the first time period.

Although UE 200 is shown as including two transmit chains coupled to respective antennas, it is to be understood that the described techniques may be implemented in a UE having more than two transmit chains coupled to respective antennas. For example, a UE having a third transmit chain coupled to a third antenna may be integrated into the antenna switching pattern of the antenna switch diversity mode. Therefore, the UE may transmit a third portion of the uplink signal using a third transmit chain coupled to a third antenna. The third transmit chain coupled to the third antenna may be activated, enabled, etc., during a third time period (e.g., during transmission of the third portion of the uplink signal) and then deactivated, disabled, etc., during the first and second time periods.

As discussed above, UE 200 may also support operating in both the antenna switch diversity mode and a CDD mode. Accordingly, UE 20 may determine that the CDD mode is to be adopted or otherwise implemented for a second transmission. Accordingly, UE 200 may transmit, according to the CDD mode, a first portion of the second uplink signal using the first transmit chain coupled to the first antenna 220 concurrently with transmitting a second portion of the second uplink signal using the second transmit chain coupled to the second antenna 225. Accordingly. UE 200 may support operations in the antenna switch diversity mode and the CDD mode using the described techniques.

Figure 3:
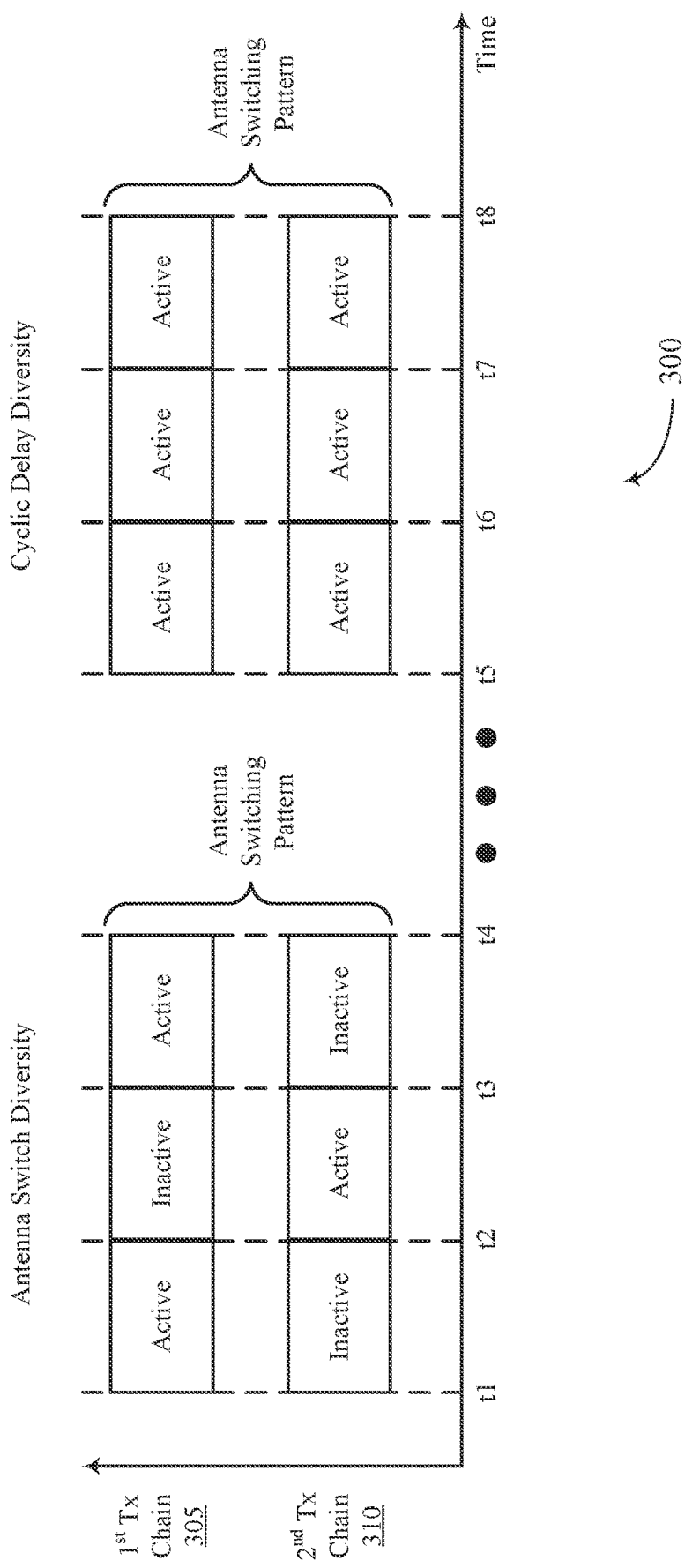
FIG. 3 illustrates an example of a timing diagram that supports low cost power efficient antenna switch diversity and cyclic delay diversity transceiver in accordance with aspects of the present disclosure.

FIG. 3 illustrates an example of a timing diagram 300 that supports low cost power efficient antenna switch diversity and cyclic delay diversity transceiver in accordance with aspects of the present disclosure. In some examples, timing diagram 300 may implement aspects of wireless communication system 100. Aspects of timing diagram 300 may be implemented by a UE, which may be an example of the corresponding devices described herein.

As discussed above, a UE may determine to operate in an antenna switch diversity mode for an uplink transmission according to an antenna switching pattern. The antenna switching pattern may include the UE switching between a first transmit chain 305 coupled to a first antenna and a second transmit chain 310 coupled to a second antenna. That is, the UE may transmit a first portion of the uplink signal using the activated first transmit chain 305 coupled to the first antenna during a first time period extending between time t1 and t2. The first time period extending between time t1 and t2 may be, in some examples, a duration of a transmission opportunity, or a mini-slot, or a slot, or a subframe, or a frame, or a certain set of one or more symbol periods. The UE may then transmit a second portion of the uplink signal using the activated second transmit chain 310 coupled to the second antenna during a second time period extending between time t2 and t3. The second time period extending between time t2 and t3 may be, in some examples, a duration of a transmission opportunity, or a mini-slot, or a slot, or a subframe, or a frame, or a certain set of one or more symbol periods. In some examples, the first time period extending between time t1 and t2 may be a same time period as the second time period extending between time t2 and t3. In other examples, the first time period extending between time t1 and t2 may be different from the second time period extending between time t2 and t3. The first time period and the second time period may collectively be referred to as a cycle of the antenna switching pattern. The antenna switching pattern may then be repeated for transmitting a third portion of the uplink signal using the activated first transmit chain 305 coupled to the first antenna during a third time period extending between time t3 and t4.

In some aspects, the first transmit chain 305 coupled to the first antenna may be deactivated, disabled, inactive, etc., during the second time period extending between time t2 and t3 (e.g., while the second transmit chain is active). Similarly, the second transmit chain 310 coupled to the second antenna may be deactivated, disabled, inactive, etc., during the first time period extending between t1 and t2 and again during the third timer period extending between t3 and t4 (e.g., while the first transmit chain 305 is active).

As also discussed above, a UE may determine to operate in a CDD mode for a second uplink transmission according to an antenna switching pattern. The antenna switching pattern may include the UE concurrently activating both the first transmit chain 305 coupled to the first antenna and the second transmit chain 310 coupled to a second antenna. That is, the UE may transmit a first portion of the second uplink signal using the activated first transmit chain 305 coupled to the first antenna during a fourth time period extending between time t5 and t6. The UE may concurrently transmit a second portion of the second uplink signal using the activated second transmit chain 310 coupled to the second antenna during the fourth time period extending between time t5 and t6. The fourth time period extending between time t5 and t6 may be, in some examples, a duration of a transmission opportunity, or a mini-slot, or a slot, or a subframe, or a frame, or a certain set of one or more symbol periods. This antenna switching pattern implemented while the UE operates in the CDD mode during corresponding fifth and sixth time periods extending between time t6 and t7 and time t7 and t8, respectively. That is, the UE may transmit a third portion of the second uplink signal using the activated first transmit chain 305 coupled to the first antenna during the fifth time period extending between time t6 and t7 while the UE concurrently transmits a third portion of the second uplink signal using the activated second transmit chain 310 coupled to the second antenna. Lastly, the UE may transmit a fifth portion of the second uplink signal using the activated first transmit chain 305 coupled to the first antenna during the sixth time period extending between time t7 and t8 while the UE concurrently transmits a sixth portion of the second uplink signal using the activated second transmit chain 310 coupled to the second antenna.

Figure 4:
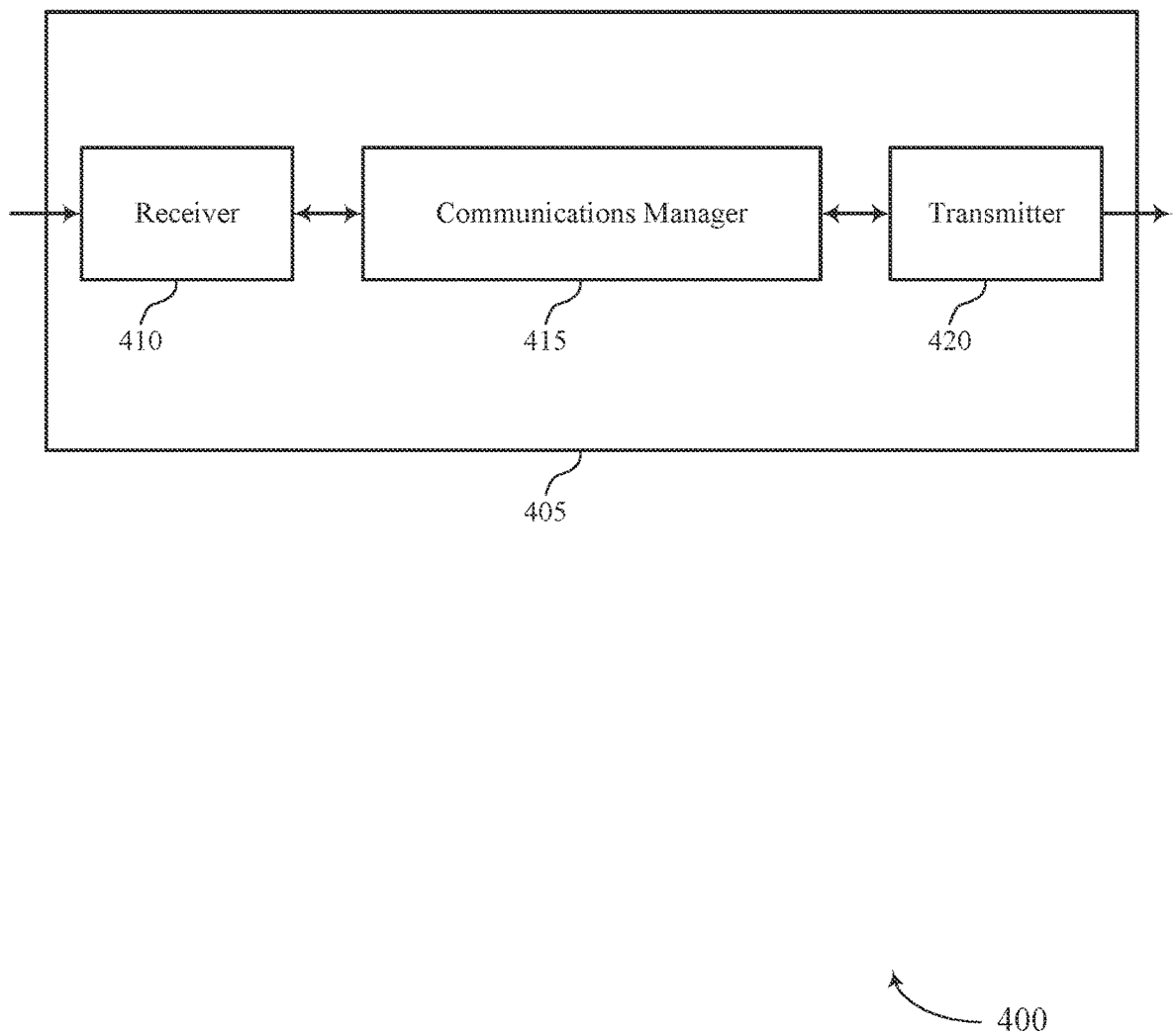
FIGS. 4 and 5 show block diagrams of devices that support low cost power efficient antenna switch diversity and cyclic delay diversity transceiver in accordance with aspects of the present disclosure.

FIG. 4 shows a block diagram 400 of a device 405 that supports low cost power efficient antenna switch diversity and cyclic delay diversity transceiver in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to low cost power efficient antenna switch diversity and cyclic delay diversity transceiver, etc.). Information may be passed on to other components of the device 405. The receiver 410 may be an example of aspects of the transceiver 720 described with reference to FIG. 7. The receiver 410 may utilize a single antenna or a set of antennas. The receiver 410 may include at least two receive chains.

The communications manager 415 may determine to operate in an antenna switch diversity mode to transmit an uplink signal according to an antenna switching pattern, the antenna switching pattern including switching between a first transmit chain coupled to a first antenna and a second transmit chain coupled to a second antenna, transmit at least a first portion of the uplink signal using the first transmit chain coupled to the first antenna, the first transmit chain coupled to the first antenna enabled according to the antenna switching pattern during transmission of the first portion of the uplink signal, and transmit at least a second portion of the uplink signal using the second transmit chain coupled to the second antenna, the second transmit chain coupled to the second antenna enabled according to the antenna switching pattern during transmission of the second portion of the uplink signal. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas. The transmitter 420 may include at least two transmit chains.

In some aspects, the communications manager 415, or its sub-components, may monitor, control, or otherwise manage aspects of the receiver 410 and/or the transmitter 420, e.g., to implement aspects of the described techniques. For example, the communications manager 415, or its sub-components, may determine for the device 405 (e.g., the UE) to operate in the antenna switch diversity mode, the CDD mode, and the like.

By including or configuring the communications manager 415 in accordance with examples as described herein, the device 405 (e.g., a processor controlling or otherwise coupled to the receiver 410, the transmitter 420, the communications manager 415, or a combination thereof) may support techniques to switch between CDD and antenna switch diversity at, for example, the PA stage, instead of at the cross-switch stage. This may result in a cost savings (e.g., one or more fewer cross-switches). This may also result in smaller front-end loss (e.g., reduced front-end insertion loss).

Figure 5:
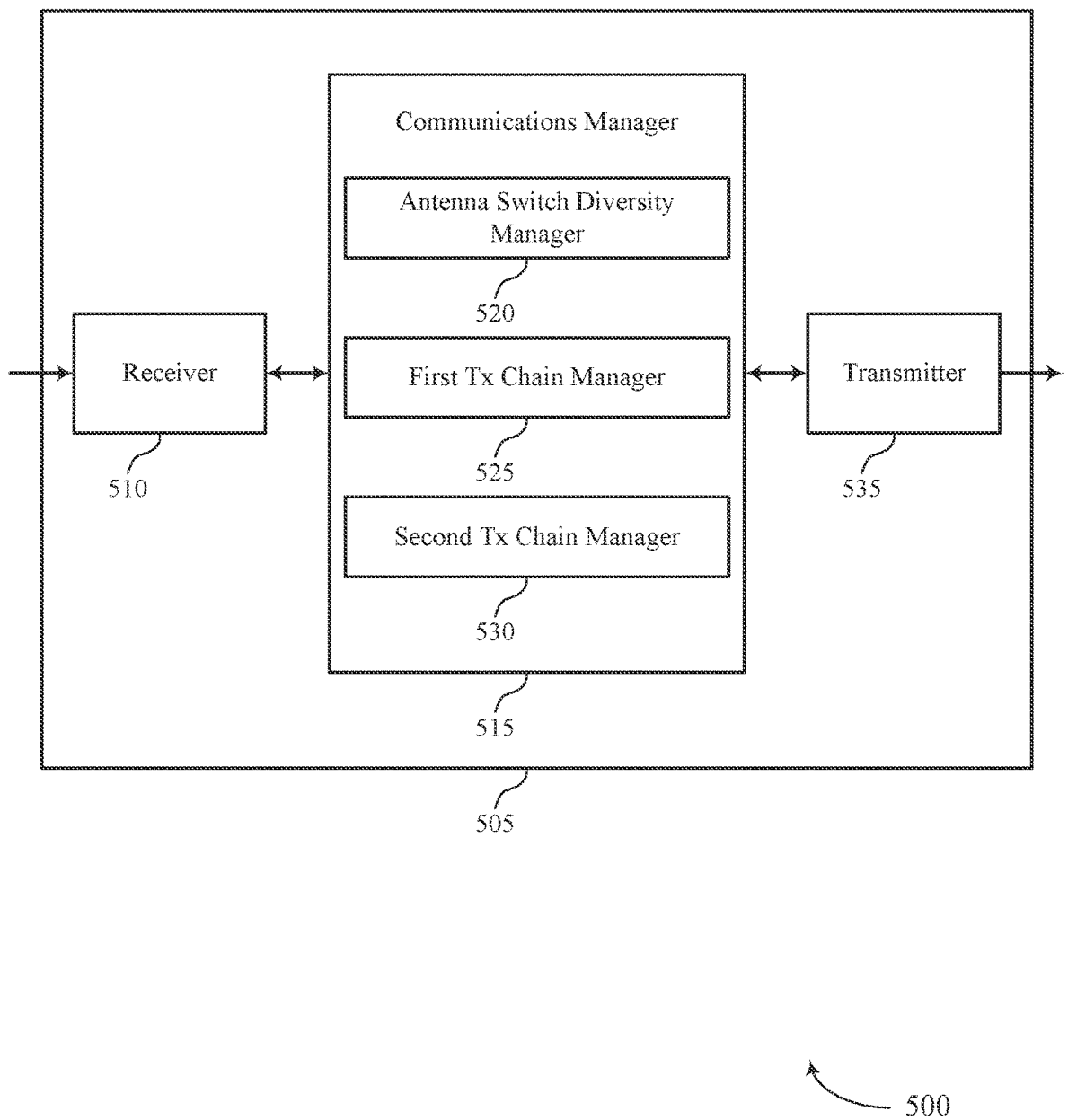

FIG. 5 shows a block diagram 500 of a device 505 that supports low cost power efficient antenna switch diversity and cyclic delay diversity transceiver in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to low cost power efficient antenna switch diversity and cyclic delay diversity transceiver, etc.). Information may be passed on to other components of the device 505. The receiver 510 may be an example of aspects of the transceiver 720 described with reference to FIG. 7. The receiver 510 may utilize a single antenna or a set of antennas. The receiver 510 may include at least two receive chains.

The communications manager 515 may be an example of aspects of the communications manager 415 as described herein. The communications manager 515 may include an antenna switch diversity manager 520, a first tx chain manager 525, and a second tx chain manager 530. The communications manager 515 may be an example of aspects of the communications manager 710 described herein.

The antenna switch diversity manager 520 may determine to operate in an antenna switch diversity mode to transmit an uplink signal according to an antenna switching pattern, the antenna switching pattern including switching between a first transmit chain coupled to a first antenna and a second transmit chain coupled to a second antenna.

The first Tx chain manager 525 may transmit at least a first portion of the uplink signal using the first transmit chain coupled to the first antenna, the first transmit chain coupled to the first antenna enabled according to the antenna switching pattern during transmission of the first portion of the uplink signal.

The second Tx chain manager 530 may transmit at least a second portion of the uplink signal using the second transmit chain coupled to the second antenna, the second transmit chain coupled to the second antenna enabled according to the antenna switching pattern during transmission of the second portion of the uplink signal.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas. The transmitter 535 may include at least two transmit chains.

In some aspects, the communications manager 515, or its sub-components, may monitor, control, or otherwise manage aspects of the receiver 510 and/or the transmitter 535, e.g., to implement aspects of the described techniques. For example, the communications manager 515, or its sub-components, may determine for the device 505 (e.g., the UE) to operate in the antenna switch diversity mode, the CDD mode, and the like.

Figure 6:
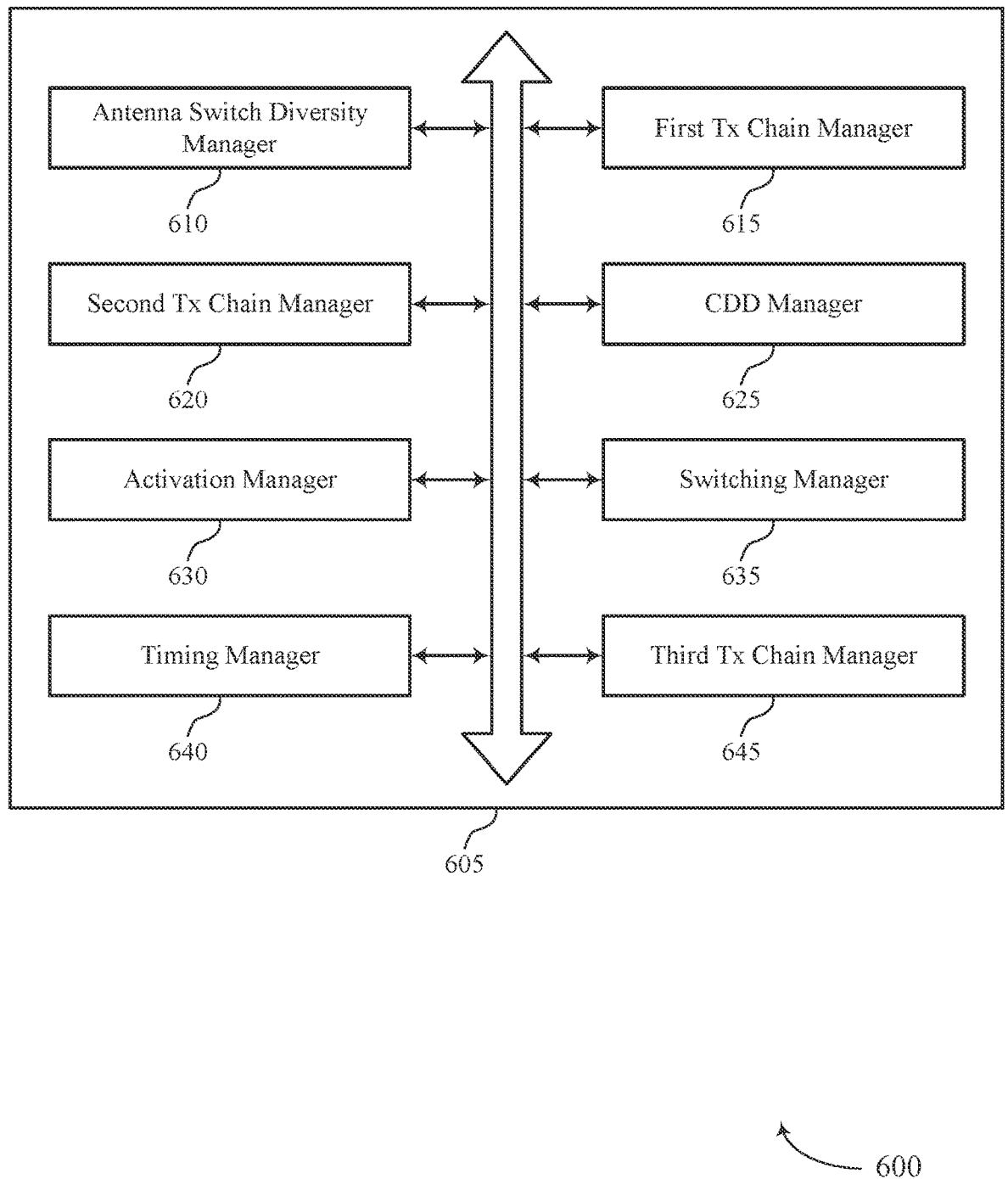
FIG. 6 shows a block diagram of a communications manager that supports low cost power efficient antenna switch diversity and cyclic delay diversity transceiver in accordance with aspects of the present disclosure.

FIG. 6 shows a block diagram 600 of a communications manager 605 that supports low cost power efficient antenna switch diversity and cyclic delay diversity transceiver in accordance with aspects of the present disclosure. The communications manager 605 may be an example of aspects of a communications manager 415, a communications manager 515, or a communications manager 710 described herein. The communications manager 605 may include an antenna switch diversity manager 610, a first Tx chain manager 615, a second Tx chain manager 620, a CDD manager 625, an activation manager 630, a switching manager 635, a timing manager 640, and a third Tx chain manager 645. Each of these modules may communicate, directly or indirectly, with one another (e.g., via one or more buses).

The antenna switch diversity manager 610 may determine to operate in an antenna switch diversity mode to transmit an uplink signal according to an antenna switching pattern, the antenna switching pattern including switching between a first transmit chain coupled to a first antenna and a second transmit chain coupled to a second antenna.

The first Tx chain manager 615 may transmit at least a first portion of the uplink signal using the first transmit chain coupled to the first antenna, the first transmit chain coupled to the first antenna enabled according to the antenna switching pattern during transmission of the first portion of the uplink signal.

The second Tx chain manager 620 may transmit at least a second portion of the uplink signal using the second transmit chain coupled to the second antenna, the second transmit chain coupled to the second antenna enabled according to the antenna switching pattern during transmission of the second portion of the uplink signal.

The CDD manager 625 may determine that CDD is to be used during transmission of a second uplink signal. In some examples, the CDD manager 625 may transmit, based on the CDD, a first portion of the second uplink signal using the first transmit chain coupled to the first antenna concurrently with transmission of a second portion of the second uplink signal using the second transmit chain coupled to the second antenna.

The activation manager 630 may deactivate, according to the antenna switching pattern, the second transmit chain coupled to the second antenna during transmission of the first portion of the uplink signal using the first transmit chain coupled to the first antenna. In some examples, the activation manager 630 may deactivate, according to the antenna switching pattern, the first transmit chain coupled to the first antenna during transmission of the second portion of the uplink signal using the second transmit chain coupled to the second antenna, where transmission of the first portion and the second portion of the uplink signal occur consecutively. In some examples, the activation manager 630 may set an amplification factor for a first power amplifier and the transmit chain prior to the first power amplifier in the first transmit chain to below a threshold. In some examples, the activation manager 630 may ramp up the deactivated first transmit chain coupled to the first antenna a threshold time prior to enabling the first transmit chain for transmitting at least the first portion of the uplink signal. In some examples, the activation manager 630 may ramp up the deactivated second transmit chain coupled to the second antenna the threshold time prior to enabling the second transmit chain for transmitting at least the second portion of the uplink signal.

In some examples, the activation manager 630 may set an amplification factor for a second power amplifier and the transmit chain prior to the second power amplifier in the second transmit chain to below the threshold. In some examples, the activation manager 630 may deactivate a first power amplifier and the transmit chain prior to the first power amplifier in the first transmit chain.

In some examples, the activation manager 630 may deactivate a second power amplifier and the transmit chain prior to the second power amplifier in the second transmit chain. In some examples, the activation manager 630 may disable a first data path feed into the first transmit chain. In some examples, the activation manager 630 may disable a second data path feed into the second transmit chain. In some examples, the activation manager 630 may deactivate a first portion of a modem in the first transmit chain. In some examples, the activation manager 630 may deactivate a second portion of the modem in the second transmit chain. In some examples, the activation manager 630 may deactivate a first radio frequency transceiver in the first transmit chain. In some examples, the activation manager 630 may deactivate a second radio frequency transceiver in the second transmit chain.

The switching manager 635 may determine to operate in the antenna switch diversity mode in a modem of the UE.

The timing manager 640 may activate the first transmit chain coupled to the first antenna for a first time period for transmission of at least the first portion of the uplink signal. In some examples, the timing manager 640 may activate the second transmit chain coupled to the second antenna for a second time period for transmission of at least the second portion of the uplink signal. In some cases, the first time period and the second time period include at least one of a transmission opportunity, or a mini-slot, or a slot, or a subframe, or a frame, or a combination thereof.

The third Tx chain manager 645 may transmit at least a third portion of the uplink signal using a third transmit chain coupled to a third antenna, the third transmit chain coupled to the third antenna enabled according to the antenna switching pattern during transmission of the third portion of the uplink signal.

Figure 7:
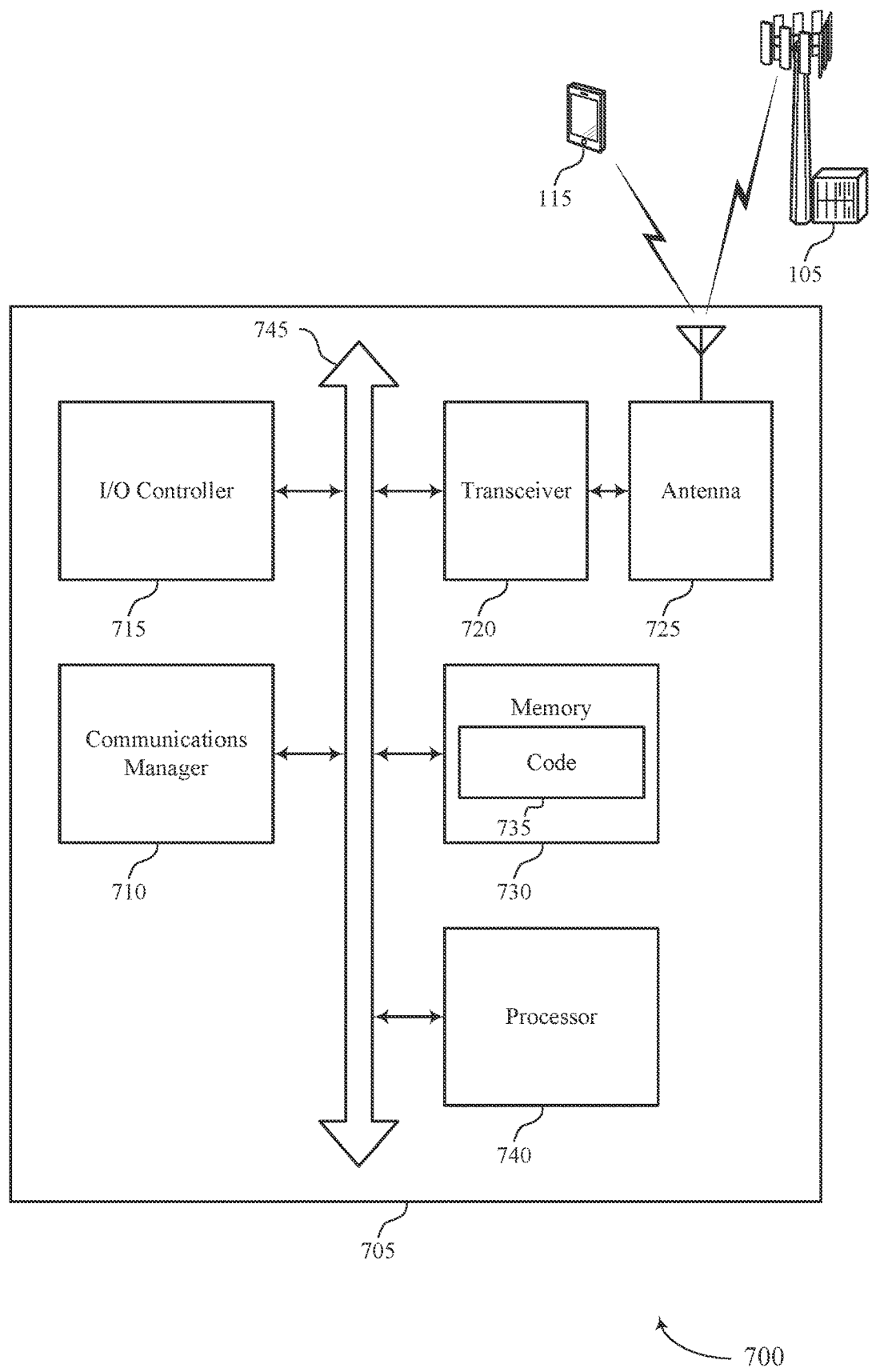
FIG. 7 shows a diagram of a system including a device that supports low cost power efficient antenna switch diversity and cyclic delay diversity transceiver in accordance with aspects of the present disclosure.

FIG. 7 shows a diagram of a system 700 including a device 705 that supports low cost power efficient antenna switch diversity and cyclic delay diversity transceiver in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may determine to operate in an antenna switch diversity mode to transmit an uplink signal according to an antenna switching pattern, the antenna switching pattern including switching between a first transmit chain coupled to a first antenna and a second transmit chain coupled to a second antenna, transmit at least a first portion of the uplink signal using the first transmit chain coupled to the first antenna, the first transmit chain coupled to the first antenna enabled according to the antenna switching pattern during transmission of the first portion of the uplink signal, and transmit at least a second portion of the uplink signal using the second transmit chain coupled to the second antenna, the second transmit chain coupled to the second antenna enabled according to the antenna switching pattern during transmission of the second portion of the uplink signal.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting low cost power efficient antenna switch diversity and cyclic delay diversity transceiver).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
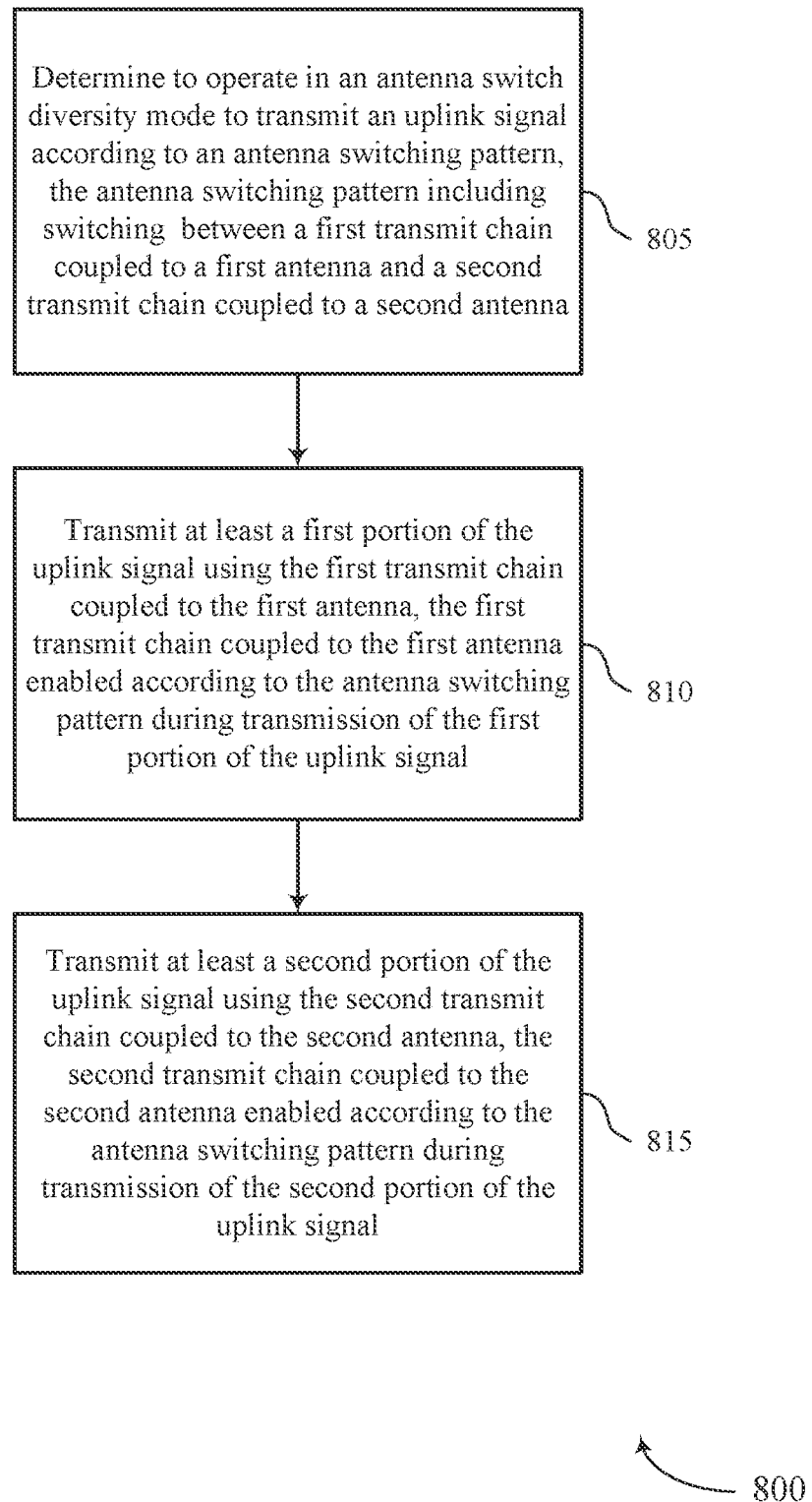
FIGS. 8 through 11 show flowcharts illustrating methods that support low cost power efficient antenna switch diversity and cyclic delay diversity transceiver in accordance with aspects of the present disclosure.

FIG. 8 shows a flowchart illustrating a method 800 that supports low cost power efficient antenna switch diversity and cyclic delay diversity transceiver in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may determine to operate in an antenna switch diversity mode to transmit an uplink signal according to an antenna switching pattern, the antenna switching pattern including switching between a first transmit chain coupled to a first antenna and a second transmit chain coupled to a second antenna. The operations of 805 may be performed according to the methods described herein. In some examples, aspects of the operations of 805 may be performed by an antenna switch diversity manager as described with reference to FIGS. 4 through 7.

At 810, the UE may transmit at least a first portion of the uplink signal using the first transmit chain coupled to the first antenna, the first transmit chain coupled to the first antenna enabled according to the antenna switching pattern during transmission of the first portion of the uplink signal. The operations of 810 may be performed according to the methods described herein. In some examples, aspects of the operations of 810 may be performed by a first Tx chain manager as described with reference to FIGS. 4 through 7.

At 815, the UE may transmit at least a second portion of the uplink signal using the second transmit chain coupled to the second antenna, the second transmit chain coupled to the second antenna enabled according to the antenna switching pattern during transmission of the second portion of the uplink signal. The operations of 815 may be performed according to the methods described herein. In some examples, aspects of the operations of 815 may be performed by a second Tx chain manager as described with reference to FIGS. 4 through 7.

Figure 9:
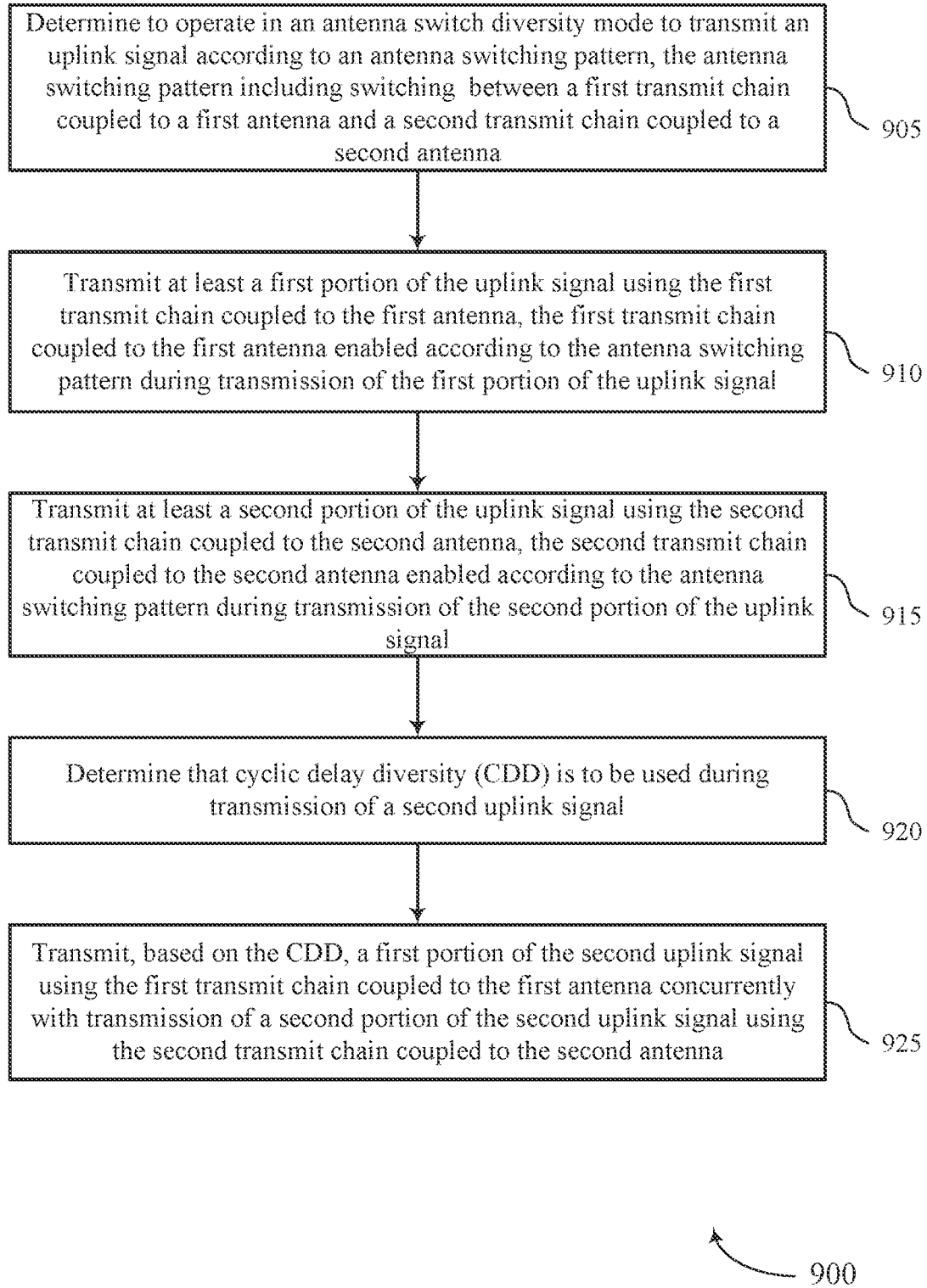

FIG. 9 shows a flowchart illustrating a method 900 that supports low cost power efficient antenna switch diversity and cyclic delay diversity transceiver in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may determine to operate in an antenna switch diversity mode to transmit an uplink signal according to an antenna switching pattern, the antenna switching pattern including switching between a first transmit chain coupled to a first antenna and a second transmit chain coupled to a second antenna. The operations of 905 may be performed according to the methods described herein. In some examples, aspects of the operations of 905 may be performed by an antenna switch diversity manager as described with reference to FIGS. 4 through 7.

At 910, the UE may transmit at least a first portion of the uplink signal using the first transmit chain coupled to the first antenna, the first transmit chain coupled to the first antenna enabled according to the antenna switching pattern during transmission of the first portion of the uplink signal. The operations of 910 may be performed according to the methods described herein. In some examples, aspects of the operations of 910 may be performed by a first Tx chain manager as described with reference to FIGS. 4 through 7.

At 915, the UE may transmit at least a second portion of the uplink signal using the second transmit chain coupled to the second antenna, the second transmit chain coupled to the second antenna enabled according to the antenna switching pattern during transmission of the second portion of the uplink signal. The operations of 915 may be performed according to the methods described herein. In some examples, aspects of the operations of 915 may be performed by a second Tx chain manager as described with reference to FIGS. 4 through 7.

At 920, the UE may determine that CDD is to be used during transmission of a second uplink signal. The operations of 920 may be performed according to the methods described herein. In some examples, aspects of the operations of 920 may be performed by a CDD manager as described with reference to FIGS. 4 through 7.

At 925, the UE may transmit, based on the CDD, a first portion of the second uplink signal using the first transmit chain coupled to the first antenna concurrently with transmission of a second portion of the second uplink signal using the second transmit chain coupled to the second antenna. The operations of 925 may be performed according to the methods described herein. In some examples, aspects of the operations of 925 may be performed by a CDD manager as described with reference to FIGS. 4 through 7.

Figure 10:
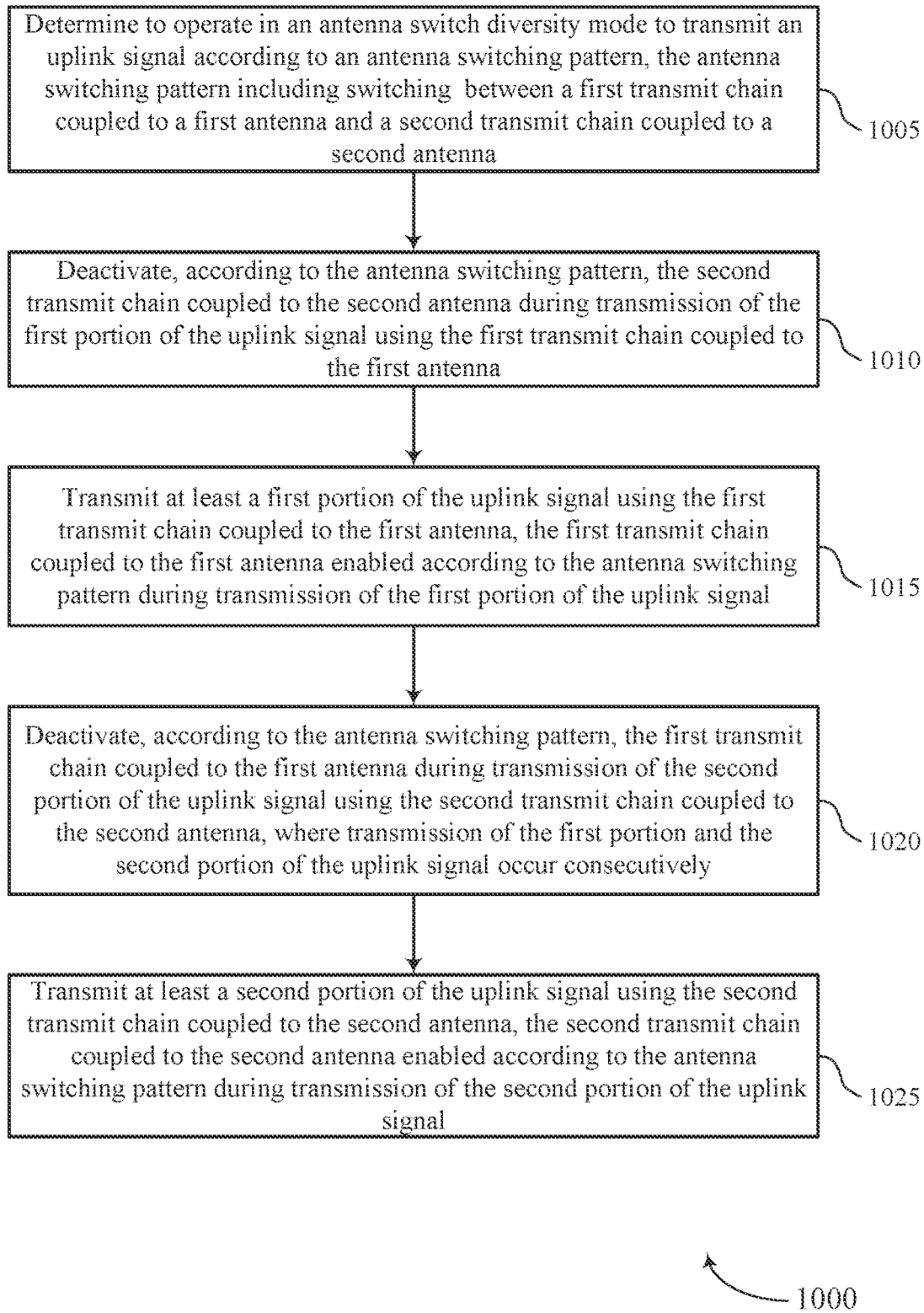

FIG. 10 shows a flowchart illustrating a method 1000 that supports low cost power efficient antenna switch diversity and cyclic delay diversity transceiver in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may determine to operate in an antenna switch diversity mode to transmit an uplink signal according to an antenna switching pattern, the antenna switching pattern including switching between a first transmit chain coupled to a first antenna and a second transmit chain coupled to a second antenna. The operations of 1005 may be performed according to the methods described herein. In some examples, aspects of the operations of 1005 may be performed by an antenna switch diversity manager as described with reference to FIGS. 4 through 7.

At 1010, the UE may deactivate, according to the antenna switching pattern, the second transmit chain coupled to the second antenna during transmission of the first portion of the uplink signal using the first transmit chain coupled to the first antenna. The operations of 1010 may be performed according to the methods described herein. In some examples, aspects of the operations of 1010 may be performed by an activation manager as described with reference to FIGS. 4 through 7.

At 1015, the UE may transmit at least a first portion of the uplink signal using the first transmit chain coupled to the first antenna, the first transmit chain coupled to the first antenna enabled according to the antenna switching pattern during transmission of the first portion of the uplink signal. The operations of 1015 may be performed according to the methods described herein. In some examples, aspects of the operations of 1015 may be performed by a first Tx chain manager as described with reference to FIGS. 4 through 7.

At 1020, the UE may deactivate, according to the antenna switching pattern, the first transmit chain coupled to the first antenna during transmission of the second portion of the uplink signal using the second transmit chain coupled to the second antenna, where transmission of the first portion and the second portion of the uplink signal occur consecutively. The operations of 1020 may be performed according to the methods described herein. In some examples, aspects of the operations of 1020 may be performed by an activation manager as described with reference to FIGS. 4 through 7.

At 1025, the UE may transmit at least a second portion of the uplink signal using the second transmit chain coupled to the second antenna, the second transmit chain coupled to the second antenna enabled according to the antenna switching pattern during transmission of the second portion of the uplink signal. The operations of 1025 may be performed according to the methods described herein. In some examples, aspects of the operations of 1025 may be performed by a second Tx chain manager as described with reference to FIGS. 4 through 7.

Figure 11:
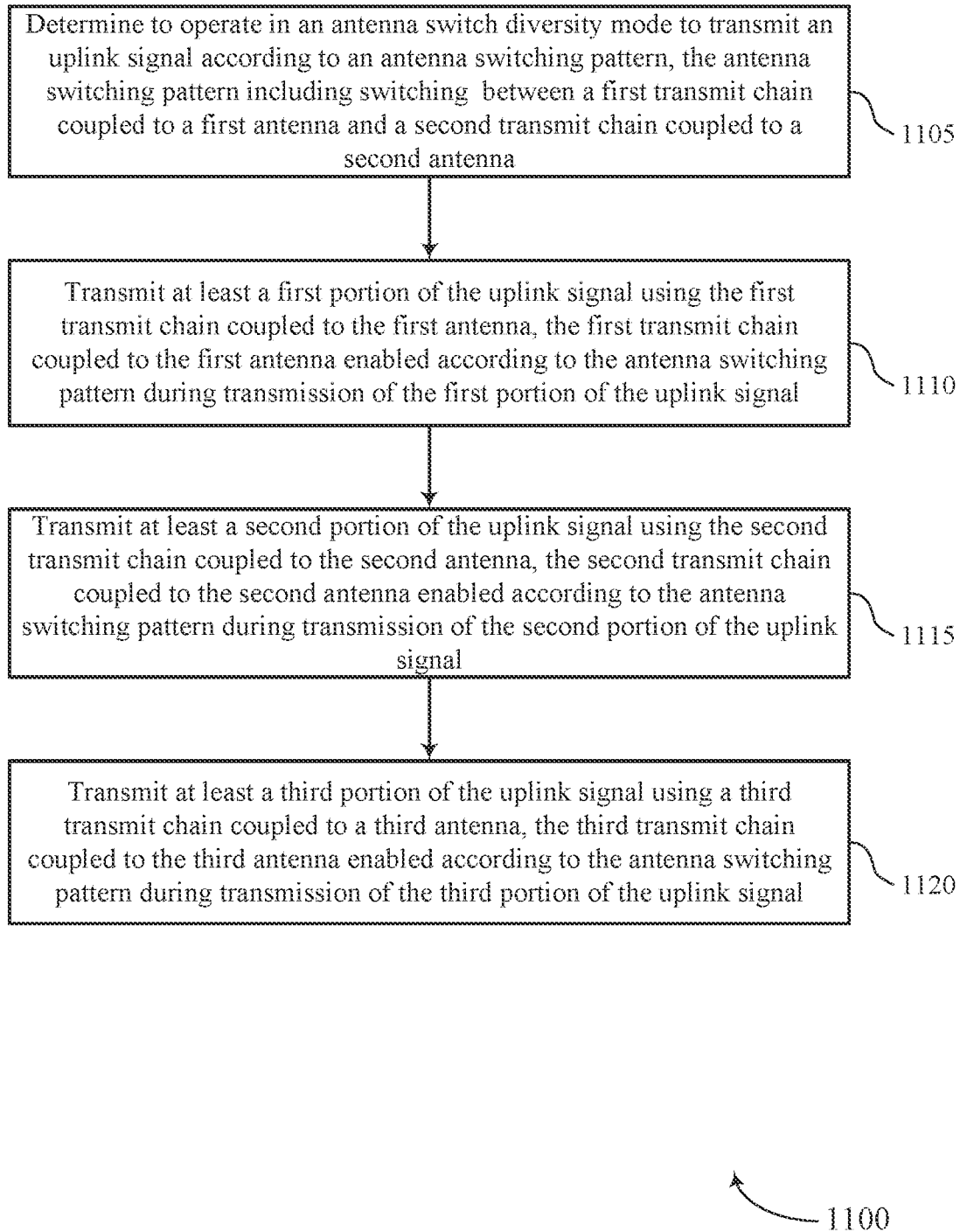

FIG. 11 shows a flowchart illustrating a method 1100 that supports low cost power efficient antenna switch diversity and cyclic delay diversity transceiver in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE may determine to operate in an antenna switch diversity mode to transmit an uplink signal according to an antenna switching pattern, the antenna switching pattern including switching between a first transmit chain coupled to a first antenna and a second transmit chain coupled to a second antenna. The operations of 1105 may be performed according to the methods described herein. In some examples, aspects of the operations of 1105 may be performed by an antenna switch diversity manager as described with reference to FIGS. 4 through 7.

At 1110, the UE may transmit at least a first portion of the uplink signal using the first transmit chain coupled to the first antenna, the first transmit chain coupled to the first antenna enabled according to the antenna switching pattern during transmission of the first portion of the uplink signal. The operations of 1110 may be performed according to the methods described herein. In some examples, aspects of the operations of 1110 may be performed by a first Tx chain manager as described with reference to FIGS. 4 through 7.

At 1115, the UE may transmit at least a second portion of the uplink signal using the second transmit chain coupled to the second antenna, the second transmit chain coupled to the second antenna enabled according to the antenna switching pattern during transmission of the second portion of the uplink signal. The operations of 1115 may be performed according to the methods described herein. In some examples, aspects of the operations of 1115 may be performed by a second Tx chain manager as described with reference to FIGS. 4 through 7.

At 1120, the UE may transmit at least a third portion of the uplink signal using a third transmit chain coupled to a third antenna, the third transmit chain coupled to the third antenna enabled according to the antenna switching pattern during transmission of the third portion of the uplink signal. The operations of 1120 may be performed according to the methods described herein. In some examples, aspects of the operations of 1120 may be performed by a third Tx chain manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: determining to operate in an antenna switch diversity mode to transmit an uplink signal according to an antenna switching pattern, the antenna switching pattern comprising switching between a first transmit chain coupled to a first antenna and a second transmit chain coupled to a second antenna; transmitting at least a first portion of the uplink signal using the first transmit chain coupled to the first antenna, the first transmit chain coupled to the first antenna enabled according to the antenna switching pattern during transmission of the first portion of the uplink signal; and transmitting at least a second portion of the uplink signal using the second transmit chain coupled to the second antenna, the second transmit chain coupled to the second antenna enabled according to the antenna switching pattern during transmission of the second portion of the uplink signal.

Aspect 2: The method of aspect 1, further comprising: determining that CDD is to be used during transmission of a second uplink signal; and transmitting, based at least in part on the CDD, a first portion of the second uplink signal using the first transmit chain coupled to the first antenna concurrently with transmission of a second portion of the second uplink signal using the second transmit chain coupled to the second antenna.

Aspect 3: The method of any of aspects 1 through 2, further comprising: deactivating, according to the antenna switching pattern, the second transmit chain coupled to the second antenna during transmission of the first portion of the uplink signal using the first transmit chain coupled to the first antenna; and deactivating, according to the antenna switching pattern, the first transmit chain coupled to the first antenna during transmission of the second portion of the uplink signal using the second transmit chain coupled to the second antenna, wherein transmission of the first portion and the second portion of the uplink signal occur consecutively.

Aspect 4: The method of aspect 3, wherein deactivating the first transmit chain and deactivating the second transmit chain comprises: setting an amplification factor for a first power amplifier and the transmit chain prior to the first power amplifier in the first transmit chain to below a threshold; and setting an amplification factor for a second power amplifier and the transmit chain prior to the second power amplifier in the second transmit chain to below the threshold.

Aspect 5: The method of any of aspects 3 through 4, wherein deactivating the first transmit chain and deactivating the second transmit chain comprises: deactivating a first power amplifier and the transmit chain prior to the first power amplifier in the first transmit chain; and deactivating a second power amplifier and the transmit chain prior to the second power amplifier in the second transmit chain.

Aspect 6: The method of any of aspects 3 through 5, wherein deactivating the first transmit chain and deactivating the second transmit chain comprises: disabling a first data path feed into the first transmit chain; and disabling a second data path feed into the second transmit chain.

Aspect 7: The method of any of aspects 3 through 6, wherein deactivating the first transmit chain and deactivating the second transmit chain comprises: deactivating a first portion of a modem in the first transmit chain; and deactivating a second portion of the modem in the second transmit chain.

Aspect 8: The method of any of aspects 3 through 7, wherein deactivating the first transmit chain and deactivating the second transmit chain comprises: deactivating a first radio frequency transceiver in the first transmit chain; and deactivating a second radio frequency transceiver in the second transmit chain.

Aspect 9: The method of any of aspects 3 through 8, wherein deactivating the first transmit chain and deactivating the second transmit chain comprises: ramping up the deactivated first transmit chain coupled to the first antenna a threshold time prior to enabling the first transmit chain for transmitting at least the first portion of the uplink signal; and ramping up the deactivated second transmit chain coupled to the second antenna the threshold time prior to enabling the second transmit chain for transmitting at least the second portion of the uplink signal.

Aspect 10: The method of any of aspects 1 through 9, further comprising: determining to operate in the antenna switch diversity mode in a modem of the UE.

Aspect 11: The method of any of aspects 1 through 10, wherein the antenna switching pattern comprises: activating the first transmit chain coupled to the first antenna for a first time period for transmission of at least the first portion of the uplink signal; and activating the second transmit chain coupled to the second antenna for a second time period for transmission of at least the second portion of the uplink signal.

Aspect 12: The method of aspect 11, wherein the first time period and the second time period comprise at least one of a transmission opportunity, or a mini-slot, or a slot, or a subframe, or a frame, or a combination thereof.

Aspect 13: The method of any of aspects 1 through 12, further comprising: transmitting at least a third portion of the uplink signal using a third transmit chain coupled to a third antenna, the third transmit chain coupled to the third antenna enabled according to the antenna switching pattern during transmission of the third portion of the uplink signal.

Aspect 14: An apparatus for wireless communication at a UE, comprising a processor; memory coupled with the processor; and instructions stored in the memory and executable by the processor to cause the apparatus to perform a method of any of aspects 1 through 13.

Aspect 15: An apparatus for wireless communication at a UE, comprising at least one means for performing a method of any of aspects 1 through 13.

Aspect 16: A non-transitory computer-readable medium storing code for wireless communication at a UE, the code comprising instructions executable by a processor to perform a method of any of aspects 1 through 13.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims. "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    determining to operate in an antenna switch diversity mode to transmit an uplink signal according to an antenna switching pattern, the antenna switching pattern comprising switching between a first transmit chain coupled to a first antenna and a second transmit chain coupled to a second antenna;
    transmitting at least a first portion of the uplink signal using the first transmit chain coupled to the first antenna, the first transmit chain coupled to the first antenna enabled according to the antenna switching pattern during transmission of the first portion of the uplink signal; and
    transmitting at least a second portion of the uplink signal using the second transmit chain coupled to the second antenna, the second transmit chain coupled to the second antenna enabled according to the antenna switching pattern during transmission of the second portion of the uplink signal, wherein the UE switches from transmitting using the first transmit chain to transmitting using the second transmit chain based at least in part on deactivating the first transmit chain for transmission of the second portion of the uplink signal.

2. The method of claim 1, further comprising:
    determining that cyclic delay diversity (CDD) is to be used during transmission of a second uplink signal; and
    transmitting, based at least in part on the CDD, a first portion of the second uplink signal using the first transmit chain coupled to the first antenna concurrently with transmission of a second portion of the second uplink signal using the second transmit chain coupled to the second antenna based at least in part on activating the first transmit chain during transmission of the second portion of the second uplink signal.

3. The method of claim 1, further comprising:
    deactivating, according to the antenna switching pattern, the second transmit chain coupled to the second antenna during transmission of the first portion of the uplink signal using the first transmit chain coupled to the first antenna; and
    deactivating, according to the antenna switching pattern, the first transmit chain coupled to the first antenna during transmission of the second portion of the uplink signal using the second transmit chain coupled to the second antenna, wherein transmission of the first portion and the second portion of the uplink signal occur consecutively.

4. The method of claim 3, wherein deactivating the first transmit chain and deactivating the second transmit chain comprises:
    setting a first amplification factor for a first power amplifier in the first transmit chain prior to the first power amplifier in the first transmit chain to below a threshold; and
    setting a second amplification factor for a second power amplifier in the second transmit chain prior to the second power amplifier in the second transmit chain to below the threshold.

5. The method of claim 3, wherein deactivating the first transmit chain and deactivating the second transmit chain comprises:
    deactivating a first power amplifier in the first transmit chain prior to the first power amplifier in the first transmit chain; and
    deactivating a second power amplifier in the second transmit chain prior to the second power amplifier in the second transmit chain.

6. The method of claim 3, wherein deactivating the first transmit chain and deactivating the second transmit chain comprises:
    disabling a first data path feed into the first transmit chain; and
    disabling a second data path feed into the second transmit chain.

7. The method of claim 3, wherein deactivating the first transmit chain and deactivating the second transmit chain comprises:
    deactivating a first portion of a modem in the first transmit chain; and
    deactivating a second portion of the modem in the second transmit chain.

8. The method of claim 3, wherein deactivating the first transmit chain and deactivating the second transmit chain comprises:
    deactivating a first radio frequency transceiver in the first transmit chain; and
    deactivating a second radio frequency transceiver in the second transmit chain.

9. The method of claim 3, wherein deactivating the first transmit chain and deactivating the second transmit chain comprises:
    ramping up the deactivated first transmit chain coupled to the first antenna a threshold time prior to enabling the first transmit chain for transmitting at least the first portion of the uplink signal; and
    ramping up the deactivated second transmit chain coupled to the second antenna the threshold time prior to enabling the second transmit chain for transmitting at least the second portion of the uplink signal.

10. The method of claim 1, further comprising:
    determining to operate in the antenna switch diversity mode in a modem of the UE.

11. The method of claim 1, wherein the antenna switching pattern comprises:
    activating the first transmit chain coupled to the first antenna for a first time period for transmission of at least the first portion of the uplink signal; and
    activating the second transmit chain coupled to the second antenna for a second time period for transmission of at least the second portion of the uplink signal.

12. The method of claim 11, wherein the first time period and the second time period comprise at least one of a transmission opportunity, or a mini-slot, or a slot, or a subframe, or a frame, or a combination thereof.

13. The method of claim 1, further comprising:
transmitting at least a third portion of the uplink signal using a third transmit chain coupled to a third antenna, the third transmit chain coupled to the third antenna enabled according to the antenna switching pattern during transmission of the third portion of the uplink signal.

14. An apparatus for wireless communication at a user equipment (UE), comprising:
a processor,
memory coupled with the processor; and
instructions stored in the memory and executable by the processor to cause the apparatus to:
determine to operate in an antenna switch diversity mode to transmit an uplink signal according to an antenna switching pattern, the antenna switching pattern comprising switching between a first transmit chain coupled to a first antenna and a second transmit chain coupled to a second antenna;
transmit at least a first portion of the uplink signal using the first transmit chain coupled to the first antenna, the first transmit chain coupled to the first antenna enabled according to the antenna switching pattern during transmission of the first portion of the uplink signal; and
transmit at least a second portion of the uplink signal using the second transmit chain coupled to the second antenna, the second transmit chain coupled to the second antenna enabled according to the antenna switching pattern during transmission of the second portion of the uplink signal, wherein the UE switches from transmitting using the first transmit chain to transmitting using the second transmit chain based at least in part on deactivating the first transmit chain for transmission of the second portion of the uplink signal.

15. The apparatus of claim 14, wherein the instructions are further executable by the processor to cause the apparatus to:
determine that cyclic delay diversity (CDD) is to be used during transmission of a second uplink signal; and
transmit, based at least in part on the CDD, a first portion of the second uplink signal using the first transmit chain coupled to the first antenna concurrently with transmission of a second portion of the second uplink signal using the second transmit chain coupled to the second antenna based at least in part on activating the first transmit chain during transmission of the second portion of the second uplink signal.

16. The apparatus of claim 14, wherein the instructions are further executable by the processor to cause the apparatus to:
deactivate, according to the antenna switching pattern, the second transmit chain coupled to the second antenna during transmission of the first portion of the uplink signal using the first transmit chain coupled to the first antenna; and
deactivate, according to the antenna switching pattern, the first transmit chain coupled to the first antenna during transmission of the second portion of the uplink signal using the second transmit chain coupled to the second antenna, wherein transmission of the first portion and the second portion of the uplink signal occur consecutively.

17. The apparatus of claim 16, wherein the instructions to deactivate the first transmit chain and to deactivate the second transmit chain are executable by the processor to cause the apparatus to:
set a first amplification factor for a first power amplifier in the first transmit chain prior to the first power amplifier in the first transmit chain to below a threshold; and
set a second amplification factor for a second power amplifier in the second transmit chain prior to the second power amplifier in the second transmit chain to below the threshold.

18. The apparatus of claim 16, wherein the instructions to deactivate the first transmit chain and to deactivate the second transmit chain are executable by the processor to cause the apparatus to:
deactivate a first power amplifier in the first transmit chain prior to the first power amplifier in the first transmit chain; and
deactivate a second power amplifier in the second transmit chain prior to the second power amplifier in the second transmit chain.

19. The apparatus of claim 16, wherein the instructions to deactivate the first transmit chain and to deactivate the second transmit chain are executable by the processor to cause the apparatus to:
disable a first data path feed into the first transmit chain; and
disable a second data path feed into the second transmit chain.

20. The apparatus of claim 16, wherein the instructions to deactivate the first transmit chain and to deactivate the second transmit chain are executable by the processor to cause the apparatus to:
deactivate a first portion of a modem in the first transmit chain; and
deactivate a second portion of the modem in the second transmit chain.

21. The apparatus of claim 16, wherein the instructions to deactivate the first transmit chain and to deactivate the second transmit chain are executable by the processor to cause the apparatus to:
deactivate a first radio frequency transceiver in the first transmit chain; and
deactivate a second radio frequency transceiver in the second transmit chain.

22. The apparatus of claim 16, wherein the instructions to deactivate the first transmit chain and to deactivate the second transmit chain are executable by the processor to cause the apparatus to:
ramp up the deactivated first transmit chain coupled to the first antenna a threshold time prior to enabling the first transmit chain for transmitting at least the first portion of the uplink signal; and
ramp up the deactivated second transmit chain coupled to the second antenna the threshold time prior to enabling the second transmit chain for transmitting at least the second portion of the uplink signal.

23. The apparatus of claim 14, wherein the antenna switching pattern comprises:
activate the first transmit chain coupled to the first antenna for a first time period for transmission of at least the first portion of the uplink signal; and activate the second transmit chain coupled to the second antenna for a second time period for transmission of at least the second portion of the uplink signal.

24. The apparatus of claim 14, wherein the instructions are further executable by the processor to cause the apparatus to:
transmit at least a third portion of the uplink signal using a third transmit chain coupled to a third antenna, the third transmit chain coupled to the third antenna enabled according to the antenna switching pattern during transmission of the third portion of the uplink signal.

25. An apparatus for wireless communication at a user equipment (UE), comprising:
means for determining to operate in an antenna switch diversity mode to transmit an uplink signal according to an antenna switching pattern, the antenna switching pattern comprising switching between a first transmit chain coupled to a first antenna and a second transmit chain coupled to a second antenna;
means for transmitting at least a first portion of the uplink signal using the first transmit chain coupled to the first antenna, the first transmit chain coupled to the first antenna enabled according to the antenna switching pattern during transmission of the first portion of the uplink signal; and
means for transmitting at least a second portion of the uplink signal using the second transmit chain coupled to the second antenna, the second transmit chain coupled to the second antenna enabled according to the antenna switching pattern during transmission of the second portion of the uplink signal, wherein the UE switches from transmitting using the first transmit chain to transmitting using the second transmit chain based at least in part on deactivating the first transmit chain for transmission of the second portion of the uplink signal.

26. The apparatus of claim 25, further comprising:
means for determining that cyclic delay diversity (CDD) is to be used during transmission of a second uplink signal; and
means for transmitting, based at least in part on the CDD, a first portion of the second uplink signal using the first transmit chain coupled to the first antenna concurrently with transmission of a second portion of the second uplink signal using the second transmit chain coupled to the second antenna based at least in part on activating the first transmit chain during transmission of the second portion of the second uplink signal.

27. The apparatus of claim 25, further comprising:
means for deactivating, according to the antenna switching pattern, the second transmit chain coupled to the second antenna during transmission of the first portion of the uplink signal using the first transmit chain coupled to the first antenna; and
means for deactivating, according to the antenna switching pattern, the first transmit chain coupled to the first antenna during transmission of the second portion of the uplink signal using the second transmit chain coupled to the second antenna, wherein transmission of the first portion and the second portion of the uplink signal occur consecutively.

28. The apparatus of claim 25, further comprising:
means for determining to operate in the antenna switch diversity mode in a modem of the UE.

29. The apparatus of claim 25, wherein the antenna switching pattern comprises:
means for activating the first transmit chain coupled to the first antenna for a first time period for transmission of at least the first portion of the uplink signal; and
means for activating the second transmit chain coupled to the second antenna for a second time period for transmission of at least the second portion of the uplink signal.

30. A non-transitory computer-readable medium storing code for wireless communication at a user equipment (UE), the code comprising instructions executable by a processor to:
determine to operate in an antenna switch diversity mode to transmit an uplink signal according to an antenna switching pattern, the antenna switching pattern comprising switching between a first transmit chain coupled to a first antenna and a second transmit chain coupled to a second antenna;
transmit at least a first portion of the uplink signal using the first transmit chain coupled to the first antenna, the first transmit chain coupled to the first antenna enabled according to the antenna switching pattern during transmission of the first portion of the uplink signal; and
transmit at least a second portion of the uplink signal using the second transmit chain coupled to the second antenna, the second transmit chain coupled to the second antenna enabled according to the antenna switching pattern during transmission of the second portion of the uplink signal, wherein the UE switches from transmitting using the first transmit chain to transmitting using the second transmit chain based at least in part on deactivating the first transmit chain for transmission of the second portion of the uplink signal.

\* \* \* \* \*